(12) United States Patent
Gordon et al.

(10) Patent No.: US 11,589,124 B1
(45) Date of Patent: Feb. 21, 2023

(54) METHODS AND SYSTEMS FOR SEAMLESSLY TRANSPORTING OBJECTS BETWEEN CONNECTED DEVICES FOR ELECTRONIC TRANSACTIONS

(71) Applicant: Worldpay Limited, London (GB)

(72) Inventors: Kevin Gordon, Essex (GB); Charlotte Spender, Kent (GB)

(73) Assignee: Worldpay Limited, London (GB)

( * ) Notice: Subject to any disclaimer, the term of this patent is extended or adjusted under 35 U.S.C. 154(b) by 248 days.

(21) Appl. No.: 16/848,042

(22) Filed: Apr. 14, 2020

(51) Int. Cl.
*H04N 21/4722* (2011.01)
*H04N 21/478* (2011.01)
*H04N 21/41* (2011.01)
*G06Q 20/32* (2012.01)
*G06Q 20/30* (2012.01)
*G06Q 20/40* (2012.01)

(52) U.S. Cl.
CPC ....... *H04N 21/4722* (2013.01); *G06Q 20/306* (2020.05); *G06Q 20/3223* (2013.01); *G06Q 20/40145* (2013.01); *H04N 21/4126* (2013.01); *H04N 21/47815* (2013.01)

(58) Field of Classification Search
CPC ......... H04N 21/47815; H04N 21/4126; H04N 21/4722; G06Q 20/306; G06Q 20/3223; G06Q 20/40145
See application file for complete search history.

(56) References Cited

U.S. PATENT DOCUMENTS

| | | | | |
|---|---|---|---|---|
| 8,666,528 B2* | 3/2014 | Harkness | ........... | H04N 21/6582 |
| | | | | 725/18 |
| 9,143,565 B2* | 9/2015 | Hensgen | ............. | H04L 65/1059 |
| 9,197,946 B2* | 11/2015 | Zhang | ................ | H04N 21/4398 |
| 9,325,953 B2* | 4/2016 | Cheng | ............. | H04N 21/43074 |
| 9,712,855 B2* | 7/2017 | Ryu | ................... | H04N 21/6125 |
| 9,955,206 B2* | 4/2018 | Jones | ................ | H04N 21/4312 |
| 10,643,264 B2* | 5/2020 | Jones | ................ | G06Q 30/0643 |
| 10,664,138 B2* | 5/2020 | Carney | ............. | H04N 21/6581 |
| 10,839,416 B1* | 11/2020 | Desmond | ........... | H04N 21/2668 |
| 11,250,642 B1* | 2/2022 | Gordon | ................. | G06T 19/006 |
| 2002/0162120 A1* | 10/2002 | Mitchell | ............ | H04N 21/8586 |
| | | | | 725/135 |
| 2008/0134255 A1* | 6/2008 | Ferris | ................. | H04N 21/4722 |
| | | | | 725/62 |
| 2008/0163283 A1* | 7/2008 | Tan | .................. | H04N 21/43074 |
| | | | | 725/20 |
| 2012/0185886 A1* | 7/2012 | Charania | ............ | H04N 21/8173 |
| | | | | 725/2 |
| 2013/0104172 A1* | 4/2013 | Lee | ..................... | G06F 16/9032 |
| | | | | 725/60 |
| 2014/0359057 A1* | 12/2014 | Hensgen | ............ | H04N 21/4126 |
| | | | | 709/217 |

(Continued)

*Primary Examiner* — John R Schnurr
(74) *Attorney, Agent, or Firm* — Bookoff McAndrews, PLLC

(57) ABSTRACT

Methods and Systems are disclosed for displaying objects between disparate devices connected to an electronic network. One method comprises detecting, by a multimedia device connected to an electronic network, an object in a multimedia stream; determining an identifier associated with the detected object; detecting a mobile device connected to the electronic network, the mobile device being a device other than the multimedia device; and generating a display of the detected object at the detected mobile device.

20 Claims, 9 Drawing Sheets

(56) References Cited

U.S. PATENT DOCUMENTS

| | | | |
|---|---|---|---|
| 2015/0296250 A1* | 10/2015 | Casper | G06Q 30/0267 |
| | | | 725/34 |
| 2017/0131964 A1* | 5/2017 | Baek | G06F 3/1462 |
| 2019/0318405 A1* | 10/2019 | Hu | G06Q 30/0625 |
| 2019/0349640 A1* | 11/2019 | Chang | G06Q 30/0631 |
| 2019/0362154 A1* | 11/2019 | Moore | G06N 3/04 |
| 2021/0019779 A1* | 1/2021 | Desmond | H04N 21/4725 |
| 2021/0217077 A1* | 7/2021 | Drynan | G06K 19/06037 |

\* cited by examiner

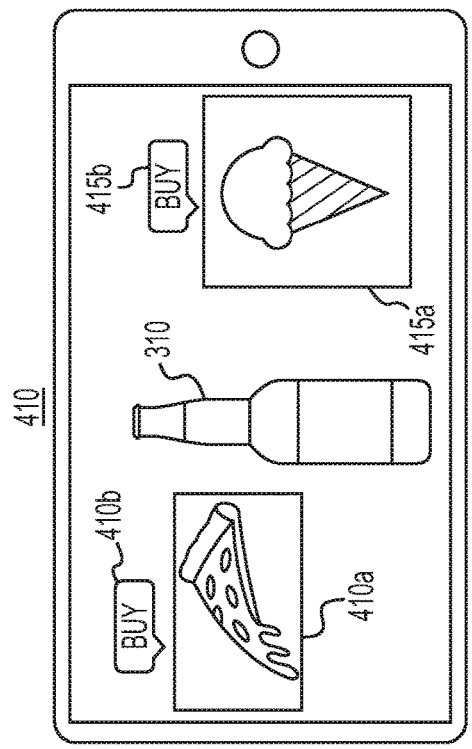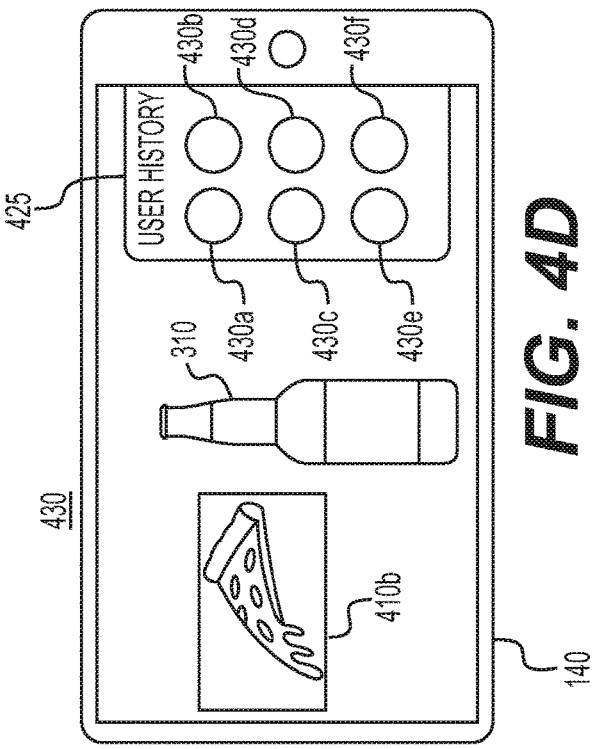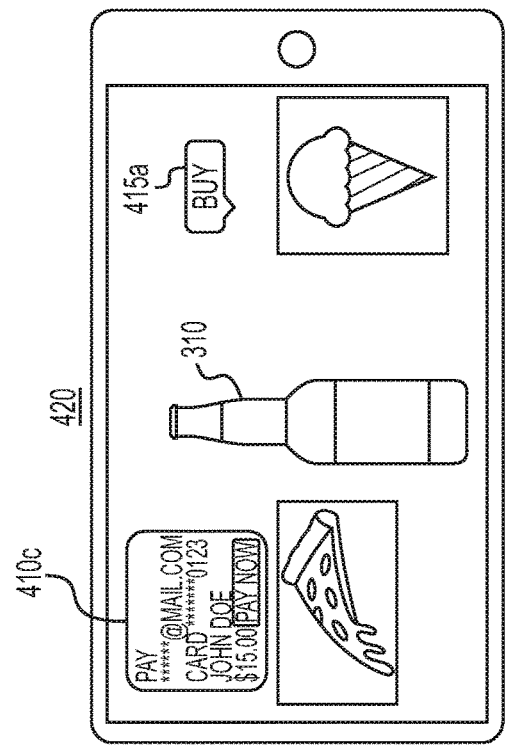

METHODS AND SYSTEMS FOR SEAMLESSLY TRANSPORTING OBJECTS BETWEEN CONNECTED DEVICES FOR ELECTRONIC TRANSACTIONS

TECHNICAL FIELD

Various embodiments of the present disclosure relate generally to augmented reality user interfaces and, more particularly, to enabling electronic transactions and presenting virtual objects across disparate devices connected to an electronic network.

INTRODUCTION

Television or radio broadcasts often contain product placement or advertisements. Such broadcasts increasingly prompt users to interact via mobile phone. For example, some broadcasts prompt users to text a number to vote for contestants or enter a raffle, visit an app store to download songs played in a broadcast, or visit a website for more information. At the same time, mobile device functionality and user interfaces are becoming increasingly advanced. In particular, augmented reality applications advancements are increasingly able to integrate a physical world with virtual, computer-supplied content. However, mobile device interfaces and augmented reality applications generate content independently from television or radio outlets.

A desire thus exists to bring television or radio content to virtual settings. In particular, a desire exists to provide television or radio content in an augmented reality setting, including on a mobile phone interface.

SUMMARY OF THE DISCLOSURE

One embodiment provides a computer-implemented method for displaying objects between disparate devices connected to an electronic network, comprising: detecting, by a multimedia device connected to an electronic network, an object in a multimedia stream; determining an identifier associated with the detected object; detecting a mobile device connected to the electronic network, the mobile device being a device other than the multimedia device; and generating a display of the detected object at the detected mobile device.

One embodiment provides a system for displaying objects between disparate devices connected to an electronic network. The system may comprise one or more processors; and a data storage comprising instructions which, when executed by the one or more processors, cause the one or more processors to perform a method comprising: detecting, by a multimedia device connected to an electronic network, an object in a multimedia stream; determining an identifier associated with the detected object; detecting a mobile device connected to the electronic network, the mobile device being a device other than the multimedia device; and generating a display of the detected object at the detected mobile device.

One embodiment provides a non-transitory computer readable medium for displaying objects between disparate devices connected to an electronic network. The non-transitory computer readable medium may store instructions which, when executed by one or more processors, cause the one or more processors to perform a method comprising: detecting, by a multimedia device connected to an electronic network, an object in a multimedia stream; determining an identifier associated with the detected object; detecting a mobile device connected to the electronic network, the mobile device being a device other than the multimedia device; and generating a display of the detected object at the detected mobile device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4A-4E depict exemplary graphical user interfaces (GUIs) presented by a user device for displaying multimedia objects and performing AR-enabled transactions, according to one aspect of the present disclosure.

DETAILED DESCRIPTION OF EMBODIMENTS

Figure 1:
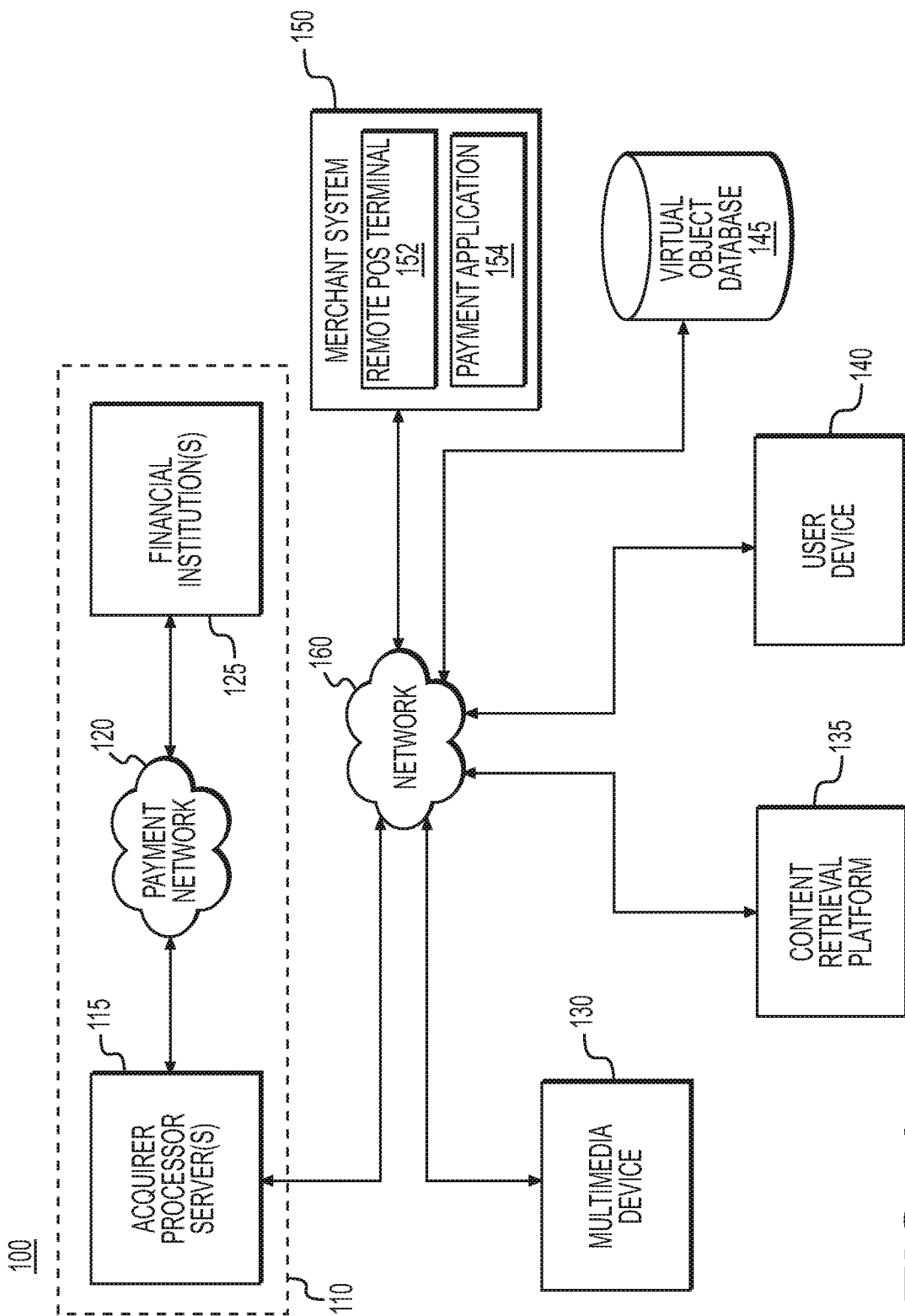
FIG. 1 depicts a block diagram of an augmented reality (AR)-enabled electronic transaction system, according to one aspect of the present disclosure.

Various embodiments of the present disclosure relate generally to augmented reality user interface and, more particularly, to enabling electronic transactions and presenting virtual objects across disparate augmented reality environments.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

For simplicity, the description that follows will be provided by reference to a "payment vehicle," "transaction vehicle," or a "payment card," which generally refers to any type of financial alternative to cash. As is to be clear to those skilled in the art, no aspect of the present disclosure is specifically limited to a specific type of payment vehicle or payment card. Therefore, it is intended that the following description encompasses the use of the present disclosure with many other forms of financial alternatives to cash, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

Television or radio broadcasts often contain objects or products that a user may wish to acquire, either as a stored virtual product, or as a physical object. At the same time, mobile device interfaces are becoming more advanced. In particular, augmented reality applications on user devices and mobile devices are increasingly integrating a physical world with virtual, computer-supplied content. However, augmented reality content is generated independently from television or radio content. There is no connection or crossover between augmented reality content and television or radio content.

The disclosed systems and methods provide an improvement to this lack of connection between television/radio content and mobile device interfaces/augmented reality content, by presenting embodiments in which users may select television/radio content to be displayed, stored, or purchased using their personal devices. With the disclosed systems and methods, users may, for instance, "grab" an object shown in a TV show, and have an image of the object appear in their mobile phone interface. Alternately, a user may hear a product mentioned in a radio show, and "swipe" to have an image of the object on their mobile phone interface. The TV or radio shows may comprise any streaming, broadcast, or downloaded content, including prerecorded content, podcasts, and any digital audio or video files. Selections of the TV and radio objects may be made by gestures (e.g., swiping, grabbing, pinching, or other motions), voice commands, body motions, controller signals or motions, biometric data submissions, or a combination thereof.

In one embodiment, objects in TV or radio content may be detected via any object detection techniques, e.g., machine learning methods, speech recognition, sound recognition, image recognition, a library of predetermined objects, a sponsored object listing, previous transaction history associated with a user, or a combination thereof. Alternately or in addition, object identifiers or object information may be stored with the TV or radio content. Once the object is detected, a virtual version of the object may be available for a user to select and incorporate into their personal device interfaces, e.g., an interface viewable from an augmented reality app installed on their personal mobile device. Object detection may be performed before, during, or after a TV or radio show is being presented or consumed by a user. For example, an embodiment having stored object information or object identifiers is a scenario in which object detection is performed prior to presentation of the TV or radio show. Concurrent object detection may be an embodiment in which TV or radio objects are detected, for example, via machine learning techniques, speech recognition, or image recognition, as a TV or radio show is playing.

Object detection following a TV or radio show may include a display of objects, made accessible after a TV or radio showing or after the object is shown on a screen. In come cases, object detection may occur only after a user gestures or makes some other selection with respect to the TV or radio. Alternately or in addition, a listing of objects mentioned in the course of a TV or radio show may be generated and made accessible to a user, e.g., via the user's personal device.

Interfaces on a user's personal device may allow a user to manipulate a detected object. Exemplary manipulations may include zooming, rotating, grabbing, inserting the object into augmented reality (AR) environments, storing an image, icon, or animation of the object, etc. The interfaces may also provide a menu allowing a user to view items related to the object. For example, an object comprising a beverage may have related items comprising fast food or meal delivery options. An object comprising a pair of hiking boots may have related items comprising camping or outdoor gear. In one embodiment, the related items may be inferred from crowdsourced, stored, or merchant-provided information associated with the object identifier.

The interfaces may also include payment interfaces. For example, an interface showing a virtual version of a detected object may further provide options for purchasing the detected object. Payment interfaces may include information related to an object, for instance, object specification, weight, price, delivery information, promotional code(s), user review(s), image(s) of the object, size information, use information, material composition, nutritional information, dosage, serving size, ingredient information, warnings, warranty information, or a combination thereof.

A payment interface may also include a prompt for a user to buy an object, e.g., a physical form of the object or a downloadable version of the object. In other words, if the object is an item, e.g., a tangible product, a payment interface may permit a user to order, purchase, and ship the object. If the object is an intangible product, e.g., a song, video, mobile app, membership/subscription, the payment interface may permit a user to purchase and download the object. The payment interface may also provide a display of items related to the object, for example, as determined based on the object identifier. The payment interface may further include payment authentication collection options, including requests for user payment credentials (e.g., Personal Identification Number(s), passwords, biometric data, pre-set combinations of gestures, payment vehicle/credit card number, a QR code or chip, etc.).

Referring now to the appended drawings, FIG. 1 depicts a block diagram of an AR-enabled electronic transaction system 100, according to one aspect of the present disclosure. In general, FIG. 1 depicts a payment environment 110, a multimedia device 130, a content retrieval platform 135, a user device 140, a virtual object database 145, and a merchant system 150, all connected via network 160. Network 160 may include the Internet, but may also include other networks such as a corporate WAN, cellular network, satellite network, or combination thereof, for example. The network 160 may be employed to enable data communications between the various entities illustrated in FIG. 1.

In the AR-enabled electronic transaction system 100 of FIG. 1, the payment environment 110 may include acquirer processor server(s) 115 and financial institution(s) 125, connected via a payment network 120. Acquirer processor server(s) 115 may handle electronic transactions between the financial institution of the consumer and that of a merchant (e.g., at merchant system 150). For example, an acquirer processor server 115 may receive payment vehicle information and/or corresponding authentication data, which was collected by the merchant system 150. The acquirer processor server 115 may then request, by way of payment network 120, an electronic transfer of funds from a financial institution 125 associated with the payment vehicle and the user. The acquirer processor server 115 may also transfer the funds received from the user-related financial institution 125, to a financial institution 125 associated with the merchant system 150.

The multimedia device 130 may include any home entertainment device, including a television set, speaker, projector, stereo, gaming device, etc. The content retrieval platform 135 may collect content from the multimedia device 130 and generate displays related to the content. As will be discussed in greater detail below, the content retrieval platform 135 may detect various content that could augment the scene or environment displayed by the user device 140. For example, content retrieval platform 135 may detect the devices connected to network 160, particularly the multimedia device(s) 130. Content retrieval platform 135 may also detect or receive content packages associated with programming being played on the multimedia device(s) 130. In some cases, TV and radio networks may provide content packages comprising information on consumer objects, related to the programming. For example, for a given television show, content retrieval platform 135 may receive a network-provided package of sponsored objects. Alternately or in addition, content retrieval platform 135 may detect that 16 sponsored objects were displayed in the course of television show and 8 objects were featured in commercials shown during the television show. Content retrieval platform 135 may then provide displays on a user device 140, which include the detected objects.

The displays may include payment interfaces for purchasing the detected objects or items related to the detected objects. An electronic payment interface may be provided in various formats, including augmented reality environments. In one embodiment, an electronic payment interface may be a web page where a user can provide payment vehicle information as well as the corresponding authentication data (e.g., PIN, password, CVV, answer to a secret question, biometric data, etc.). In another embodiment, an electronic payment interface may be a web-based application through which a user can provide a payment vehicle (or payment vehicle information) as well as the corresponding authentication data. In another embodiment, an electronic payment interface may entail a mobile application, e.g., installed on a user device 140. The mobile application may provide access to an electronic payment interface, for a user to enter payment vehicle information and/or authentication data. Yet another electronic payment interface may include an overlay or task window to be provided on a display of the multimedia device 130. For example, content retrieval platform 135 may prompt at least a portion of an electronic payment interface to be shown on a TV screen of a television multimedia device 130. The electronic payment interface may include augmented reality or virtual reality interfaces, elements, or features. The content retrieval platform 135 may comprise a computing system consistent with, or similar to, that depicted in FIG. 8.

The user device 140 may include, but may not be limited to, an AR consumer product (e.g., an AR headset, an AR eyewear, etc.), a smartphone, a mobile phone, a tablet computer, a laptop, a portable computer, a desktop computer, a smart watch, a wearable device, etc. The user device 140 may comprise a computing device consistent with or similar to the computing system depicted in FIG. 8. The user device 140 may capture and display an environment including one or more objects, and may receive additional prompts from the content retrieval platform 135 to present objects over a displayed environment. The user device 140 may also be used to capture requests for one or more object. For example, a user may use a user device 140 camera to frame or take a picture of an object displayed on multimedia device 130. The framed or imaged picture may serve as a request for the content retrieval platform 135. The content retrieval platform 135 may then receive and process such requests, retrieve contents from a storage, and transmit the contents to the user device 140 for a display.

In one embodiment, the virtual object database 145 may maintain a stored collection of objects. For each object, virtual object database 145 may have saved, at least one object identifier, and any specifications related to the object, e.g., weight, price, delivery information, promotional code(s), user review(s), image(s) of the object, size information, use information, material composition, nutritional information, dosage, serving size, ingredient information, warnings, warranty information, related products/objects, or a combination thereof. The virtual object database 145 may also store one or more user libraries comprising virtual objects and/or icons corresponding to the virtual objects, each user library being associated with a respective user and comprising one or more virtual objects that have been displayed to the user. An instance of a user library 248 is described in more detail at FIG. 2C.

The merchant system 150 may include a remote point of service (POS) terminal 152 and/or a payment application 154. The POS terminal 152 and payment application 154 may both be used to collect payment vehicle information, payment credentials, and/or payment authentication information. The merchant system may send a transaction authorization request by way of the network 160 to an acquirer processor server 115. The acquirer processor server 115 may then fulfill the transaction authorization request by verifying the payment vehicle information, payment credentials, and/ or payment authentication information, and prompting a transfer of funds for payment. The remote POS terminal 152 of the merchant system 150 may be in communication with the user device 140 over the network 160. In some embodiments, the merchant system 150 may provide or prompt an electronic payment interface to be displayed at the user device 140, e.g., using payment application 154.

Figure 8:
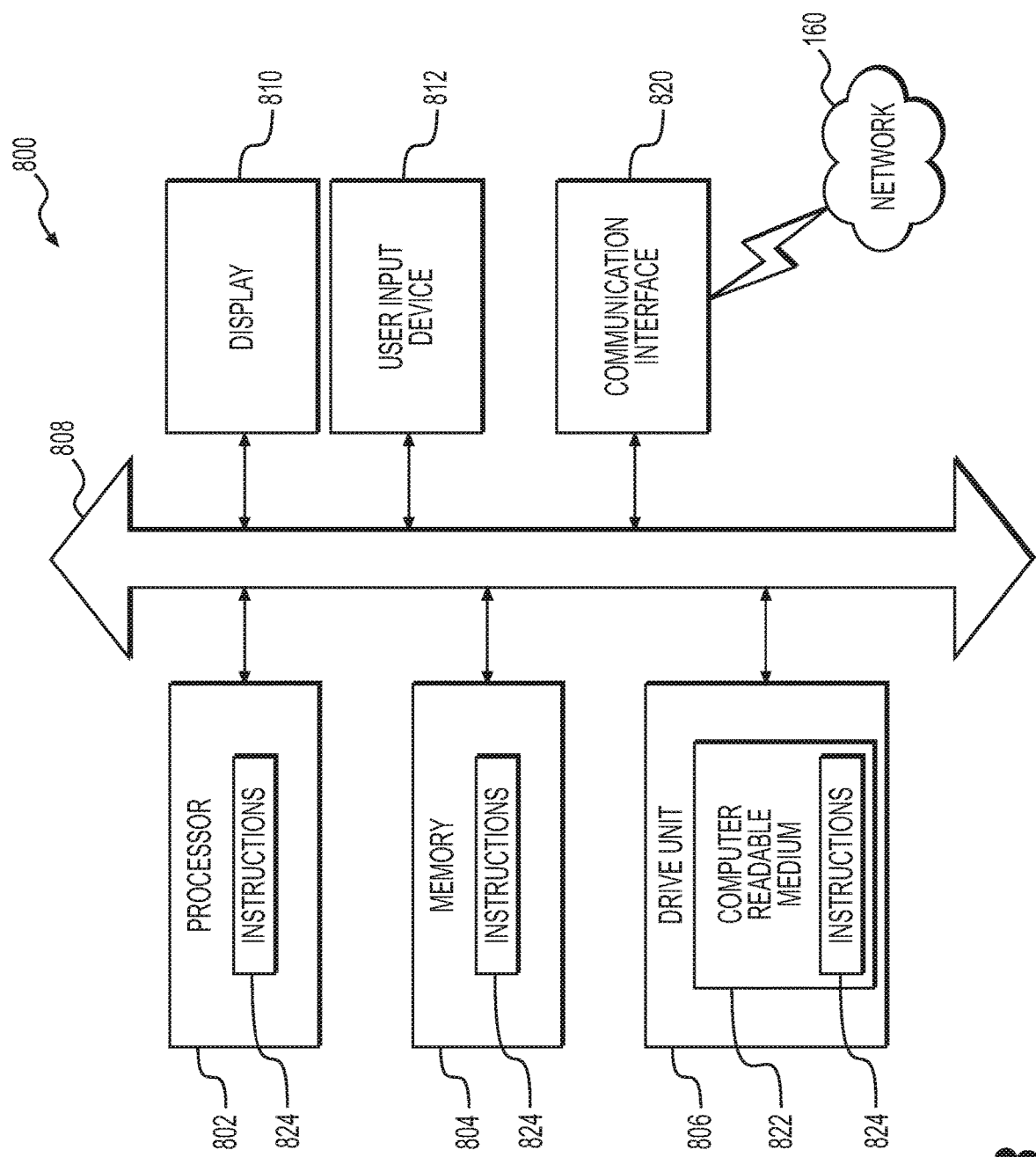
FIG. 8 illustrates an implementation of a computer system that may execute techniques presented herein.

It should be noted that, although the multimedia device 130, content retrieval platform 135, user device 140, virtual object database 145, and merchant system 150, are shown as separate entities in FIG. 1, all or a portion of these components (and the steps performed thereof) may be implemented in a single computing device consistent with or similar to that depicted in FIG. 8. The configurations specifically discussed herein regarding the arrangement of the components depicted in FIG. 1 are merely exemplary, and it would be obvious to a person of ordinary skill in the relevant art that different combinations of components may be implemented on a single or multiple computing devices.

Figure 2:
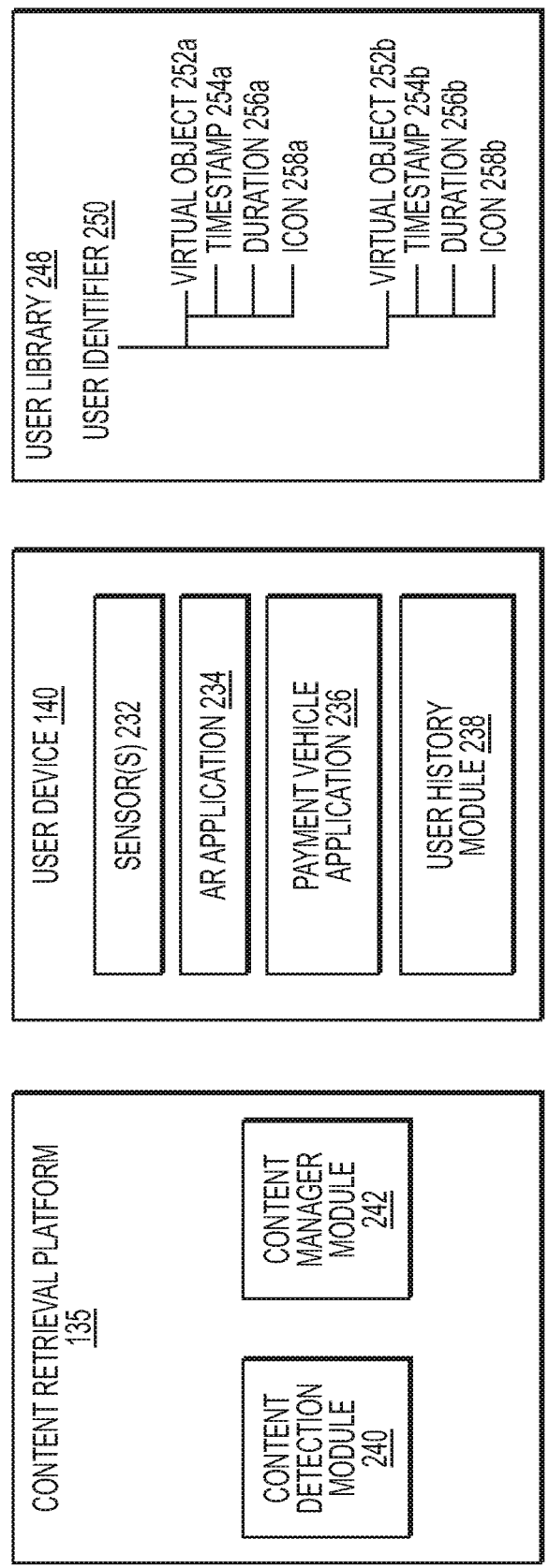
FIG. 2A depicts an exemplary embodiment of a content retrieval platform, according to one aspect of the present disclosure.
FIG. 2B depicts an exemplary embodiment of a user device, according to one aspect of the present disclosure.
FIG. 2C depicts an exemplary embodiment of a user library, according to one aspect of the present disclosure.

FIG. 2A depicts an exemplary embodiment of a content retrieval platform 135, according to one aspect of the present disclosure. In one embodiment, content retrieval platform 135 may include a content detection module 240 and a content manager module 242. In one embodiment, content detection module 240 may receive a collection of predetermined objects, e.g., a sponsored object listing associated with TV or radio content. Alternately or in addition, the content detection module 240 may perform or prompt object detection techniques, e.g., machine learning methods, speech recognition, sound recognition, image recognition, a library of predetermined objects, a sponsored object listing, previous transaction history associated with a user, or a combination thereof. Exemplary machine learning techniques may include natural language processing (NLP), text classifiers, image recognition classifiers, deep learning, convolutional neural networks, You Only Look Once (YOLO), regression problems, random forest, etc., using unsupervised machine learning such as cluster algorithms, principal component analysis (PCA), etc., reinforcement learning, or any models for detecting objects in visual contents/files, such as documents, images, pictures, drawings, media files, etc.

As one example, content detection module 240 may use a convolutional neural network (CNN) for object detection. For example, image data may be input into the CNN and passed through various convolutional layers and pooling layers. In one embodiment, the content detection module 240 may employ a CNN, which may apply a series of filters to the raw pixel data of the image to extract and learn higher-level features, which the model may then use for classification. The CNN may be composed of a stack of convolutional modules that perform feature extraction, with each module consisting of a convolutional layer followed by a pooling layer. The last convolutional module may be followed by one or more dense layers that perform classification. The types of the CNN which can be implemented with the embodiments contemplated herein may include a region-based CNN (RCNN), fast RCNN, and faster RCNN. Any currently-known or later-developed object detection techniques may be used to identify the objects from multimedia content.

The content manager module 242 may retrieve or generate a virtual version of a detected object. For example, content manager module 242 may retrieve an image file from the virtual object database 145, based on an object identifier. The content manager module 242 may also generate or prompt an interface viewable from an augmented reality app installed on a user device 140.

FIG. 2B depicts an exemplary embodiment of a user device 140 according to one aspect of the present disclosure. As alluded to above, the user device 140 may be a computing device consistent with or similar to that depicted in FIG. 8. In addition, the user device 140 may comprise sensor(s) 232, an augmented reality (AR) application 234, a payment vehicle application 236, and a user history module 238.

The sensor(s) 232 may include global positioning system (GPS) sensors, vision sensors (i.e., cameras), audio sensors (i.e., microphones), light sensors, touch sensors, temperature sensors, radio frequency sensors, direction sensors (i.e., magnetic compasses, magnetometers, gyroscopes), and acceleration sensors (i.e., accelerometers). In one embodiment, the content retrieval platform 135 may detect objects using input received from sensors 232, e.g., audio or image-based input. The content retrieval platform 135 may also initialize object detection, in response to a prompt from a user, where the prompt is received via the sensors 232. For example, a user may motion with their user device 140 and the motion may be captured via the direction and acceleration sensors 232 of the user device 140. Based on the motion, the content retrieval platform 135 may identify detected object(s) that may correspond to the motion.

The AR Application 234 may be a single application or a group of applications configured to collect various contextual data using one or more sensors 232 of the user device 140, process the collected contextual data, and provide an AR experience to the user based on the processed contextual data. For example, using a camera of the user device 140, the AR application 234 may receive a visual input that represents the real physical environment, and the content retrieval platform 135 may identify objects in the captured environment.

The AR application 234 may receive contextual data from sensors of the user device 140, such as, e.g., the GPS sensor, accelerometer, and gyroscope, in order to determine the location, distance, angle, and/or motion of the identified objects relative to the camera of the user device 140, or the location, distance, angle, and/or motion of the camera of the user device 140 relative to the identified objects. Data comprising the determined location, distance, angle, and/or motion may be referred to as location and orientation data in the present disclosure. The AR application 234 may then use the location and orientation data to adjust the size, orientation, and/or placement of virtual contents over the real environment displayed in the user device 140. The AR application 234 may then overlay or superimpose the virtual contents over the displayed environment based on the adjusted parameters. In one instance, the content retrieval platform 135 may detect and retrieve virtual objects from content conveyed via the multimedia device 130, and the AR application 234 may display the virtual objects on the user device 140. User interactions with the virtual objects may be received as input via the sensors 232, e.g., zooming, minimizing, dragging, or rotating the virtual objects. The content retrieval platform 135 and the AR application 234 may then work in conjunction to update the display, in response to the user input. For example, the content retrieval platform 135 may retrieve, find, or generate additional views of the objects, according to the user input, and the AR application 234 may display the views.

The AR application 234 and content retrieval platform 135 may further cast or project the AR application 234 to generate a display on the multimedia device, where the display may be controlled via inputs at the user device 140. For example, the user may zoom or rotate a virtual object on a touchscreen of their user device 140, and the zooming or rotation manipulation may be shown at the user device 140 screen and/or at the multimedia device 130. The displays may include full-screen displays, partial displays, overlays, pop-ups, taskbars, windows, or any combination thereof.

The payment vehicle application 236 may provide security and encryption (e.g., tokenization, etc.) for personal information needed for electronic transactions. For example, the payment vehicle application 236 may comprise digital wallet systems such as GOOGLE PAY, APPLE PAY, SAMSUNG PAY, PAYPAL, VENMO, etc. In one embodiment and as shown in FIG. 2B, the payment vehicle application 236 may be stored on the client side (i.e. user device 140) and may be fully compatible with electronic commerce websites (i.e., merchant websites). In some embodiments, the payment vehicle application 236 may be on the server side, and may be one that a merchant or an organization creates for/about a user and maintains on its server(s). The personal information retained by the payment vehicle application 236 may comprise a shipping address, a billing address, payment methods, account numbers, expiration dates, security numbers and answers, and any other information needed for authenticating an electronic transaction.

The user history module 238 may include a stored information on objects stored by the user, as well as the user's transaction or purchase history. For example, the user history module 238 may store a collection of icons for each TV/radio-derived object selected and stored by a user. These icons may be accessed by a user at a later date, either in augmented reality interfaces, additional payment/purchase scenarios, or just for reference. The icons may further be shared via social media or from one user device to another user device, e.g., via text messages. The user history module 238 may include a user library 248, as described below.

FIG. 2C depicts an exemplary embodiment of a user library 248 according to one aspect of the present disclosure. As shown in FIG. 2C, each user library 248 may be a data structure storing a user identifier 250 in association with one or more virtual objects 252a, 252b that belong to the user. Each user library 248 may thus be associated with a user identifier 250 of the corresponding user. The content retrieval platform 135 (e.g., the content manager module 242) may be configured to search for a library of virtual objects that belong to a particular user, using the user identifier of that user. Further, each virtual object (252a or 252b) stored in the user library 248 may in turn be associated with a timestamp (254a or 254b), a duration (256a or 256b), and a corresponding icon (258a or 258b). The entire user library, or one or more virtual objects and/or icons contained in the user library may then be returned to the AR application 234 of the user device 140. The virtual object(s) and corresponding icon(s) may then be stored in association with the user identifier in a local storage of the user device 140. The virtual object(s) and corresponding icon(s) stored at the user device 140 may thus resemble the user library stored in the virtual object database 145. In other words, the data stored in the local storage of the user device 140 may be in sync with the user library stored in the virtual object database 145, such that the AR application 234 may not need to contact the virtual object database 145 over the network 160 every time a virtual object and/or icon are to be rendered/displayed by the AR application 234.

Figure 3:
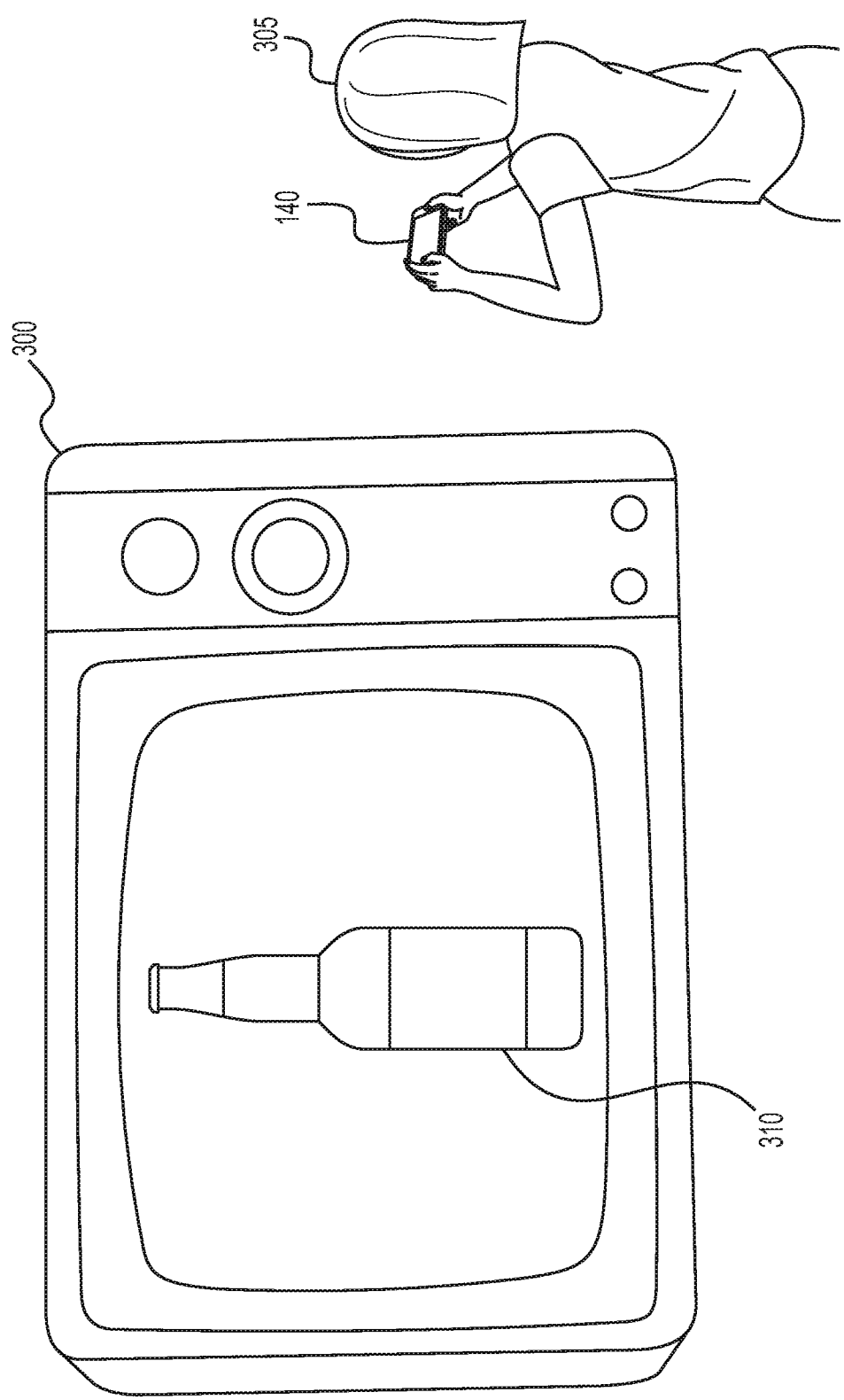
FIG. 3 illustrates an exemplary context in which the techniques presented in the present disclosure may be used.
Figure 4E:
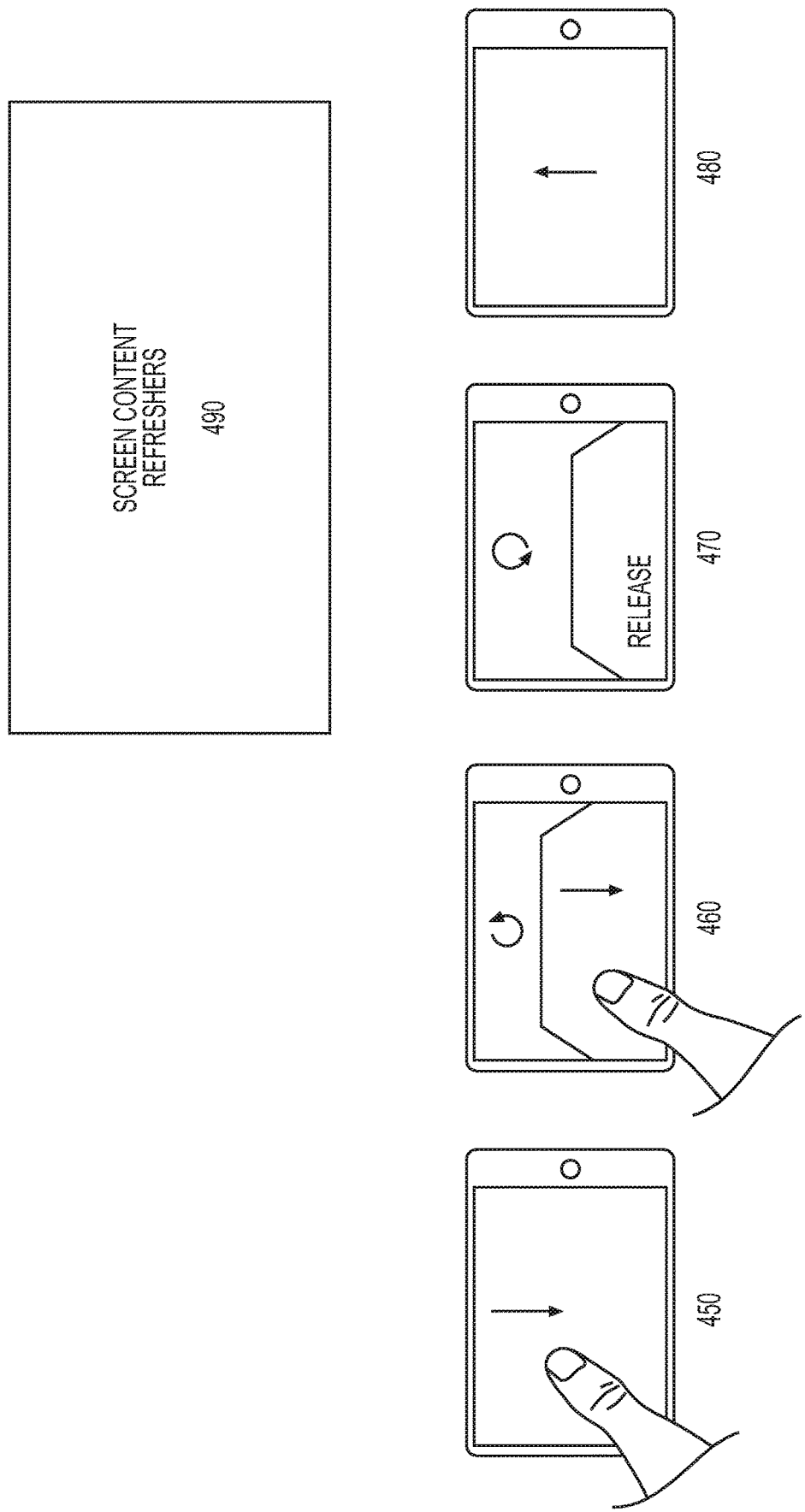

FIG. 3 illustrates an exemplary context in which the techniques presented in the current disclosure may be used, according to one aspect of the present disclosure. For example, a user 305 may view an object 310 in a multimedia stream (on a multimedia device 300). The user 305 may then opt to display an image of the object 310 on their user device 140. In one such embodiment, the display of the object 310 on the user device 140 may be part of an AR display. For example, the AR application 234 of the user device 140 may augment a displayed environment with additional content pertaining to the object 310. For example, the AR application 234 may be used in conjunction with the payment vehicle application 236 and merchant system 150 to provide an AR-enabled transaction interface. Furthermore, the AR application 234 may be used in conjunction with the content retrieval platform 135 to enable users to collect images of objects from multimedia streams, either for an AR environment or for reference on their user device 140.

In order to use the AR features contemplated in the current disclosure, the user 305 may start and/or login to the AR application 234 to start capturing the multimedia content for an AR experience. The user 305 may provide login credentials such as, for example, login ID and password, user biometric data (e.g., fingerprint, iris patterns, facial geometry, voice, etc.), etc. and the login credentials may be used to generate a user identifier associated with that user. In some embodiments, the login credentials themselves may be used as the user identifier. In other embodiments, the login procedure may not be necessary altogether. Instead, the AR application 234 may generate the user identifier based on user biometric data that are automatically captured using one or more sensors 232 of the user device 140. This way, the user's identity may be verified without requiring the login procedure, by monitoring the user's biometric data using one or more sensors 232 of the user device 140 periodically, continuously, and/or upon detecting a triggering event (e.g., user's face/eye faces the camera, user's finger touches the fingerprint scanner, etc.). The user biometric data captured automatically in lieu of the login procedure may be referred to as automatically-captured user biometric data throughout the present disclosure. Furthermore, if the user 305 is not a first time user, instead of generating a new user identifier, the AR application 234 may identify a previously-generated user identifier of the user 305 based on the login credentials or automatically-captured user biometric data.

FIGS. 4A-4E depict exemplary graphical user interfaces (GUIs) presented by the user device 140 for AR-enabled display and purchase of objects from multimedia streams. The GUIs of FIGS. 4A-4E may be rendered by the content retrieval platform 135 identifying objects from the multimedia device 130, and working in conjunction with the user device 140 and merchant system 150.

FIG. 4A depicts an exemplary interface 400, in which an object 310 retrieved from a multimedia stream may be displayed on a user device 140. For example, object 310 may be displayed as an image on interface 400. The interface 400 may further include a selection option 405, e.g., for a user to purchase the object 310. The selection option 405 may include a button or tab with a caption, e.g., "BUY." Upon detecting selection of user selection of the button or tab, payment vehicle application 236 compatible with the remote POS terminal 152 may be initiated.

As shown in FIG. 4B and interface 410, the object 310 may further be displayed with related content and corresponding selection options, e.g., a first related object 410a with corresponding purchase selection option 410b, and a second related object 415a with corresponding purchase selection option 415b. Interface 420 of FIG. 4C shows an exemplary transaction interface 410c. Transaction interface 410c may overlay or accompany a user device interface 420. In one scenario, transaction interface 410c may be displayed after receipt of user input selecting a purchase selection option, e.g., selection option 410b. The transaction interface 410c may include user payment credentials and a confirmation request, e.g., an input button with a caption reading, "pay now" or "confirm payment." Upon the user selecting the input button, the AR application 234 may, by way of the payment vehicle application 236, transmit the transaction information to the merchant system 150 (or the remote POS terminal 152 of the merchant system 150). The merchant system 150 may then generate a transaction authorization request based on the received transaction information, and transmit the transaction authorization request to an acquirer processor server 115.

In some cases, transaction interface 410c may also be confirmed or modified. For example, transaction interface 410c may include an option or prompt for user 305 to confirm/modify the displayed transaction information (e.g., user information comprising user name, user ID, payment account number, etc., which may be retained by the payment vehicle application 236 securely, transaction amount, etc.) and complete a payment in a more convenient and prompt manner.

User interface 430 of FIG. 4D presents a display having an exemplary user history menu 425 of previously collected or purchased items of the user. Icons or images of previously selected or purchased objects from a multimedia stream may be displayed in positions 430a-430f. The user history menu 425 may comprise a side pane or side bar. Menu 425 may appear briefly to confirm selection or purchase by showing an image of the object 310 (along with icon(s) representative of any other virtual object(s) that have been selected/purchased by the user 305). Menu 425 may also fold or scroll into a tab or minimized icon, so as not to obstruct the entire screen view. The tab or minimized icon may permit a user to re-open, expand, or display the menu 425, in response to user input. Exemplary user input may include touching or swiping the tab or minimized icon, which the user 305 can touch and swipe to the other side to re-open/expand the side pane menu 425. The menu 425 may also permit a user to delete or clear icons from the display.

Purchase information or related objects may be derived from the previously collected or purchased items displayed in user history menu 425. In some cases, content manager module 242 may receive a search request and determine, for a user, whether a selected item for purchase has previously been purchased, e.g., by using a user library 248. If so, the user history menu 425 may simply refresh or update a prior entry/display. If the object was not previously purchased, content manager module 242 may provide an icon or image to be used in future displays of menu 425.

Figure 5:
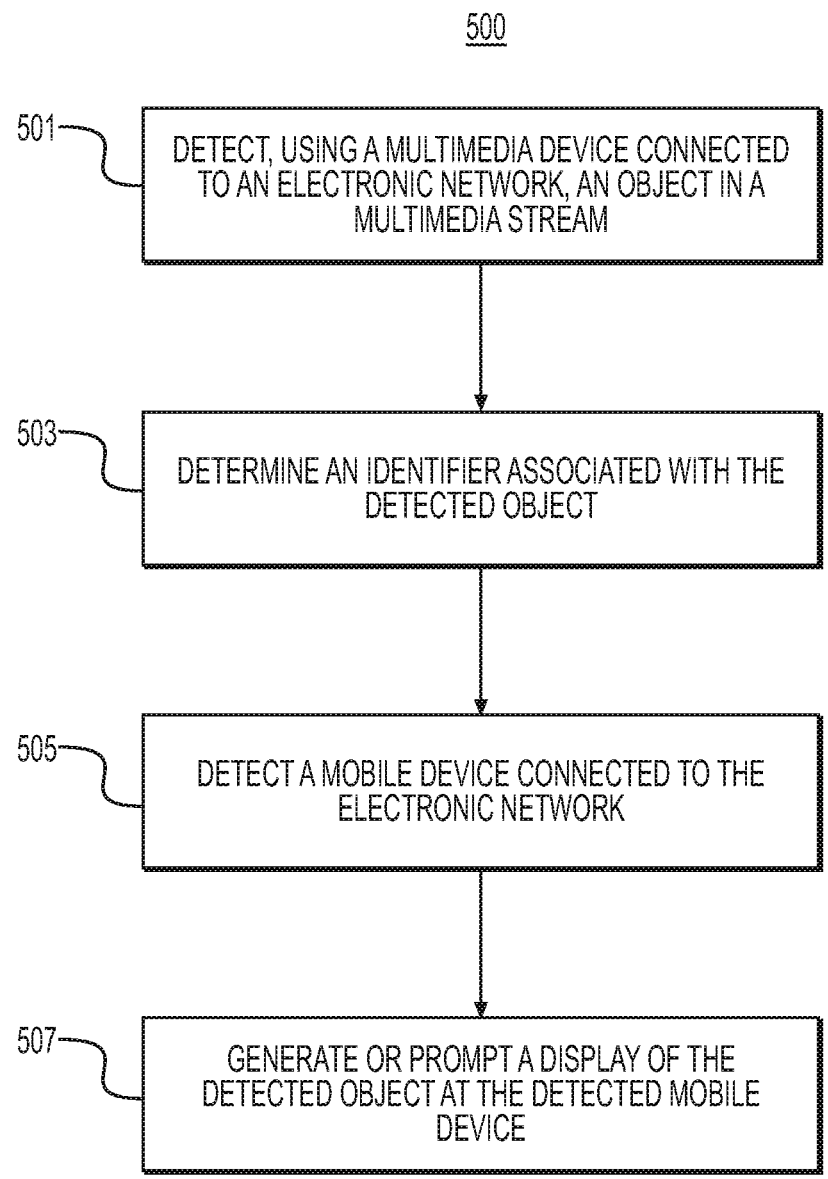
FIG. 5 is a flowchart of an exemplary method of enabling electronic transactions and presentation of virtual objects across disparate devices connected to an electronic network, according to one aspect of the present disclosure.
Figure 6:
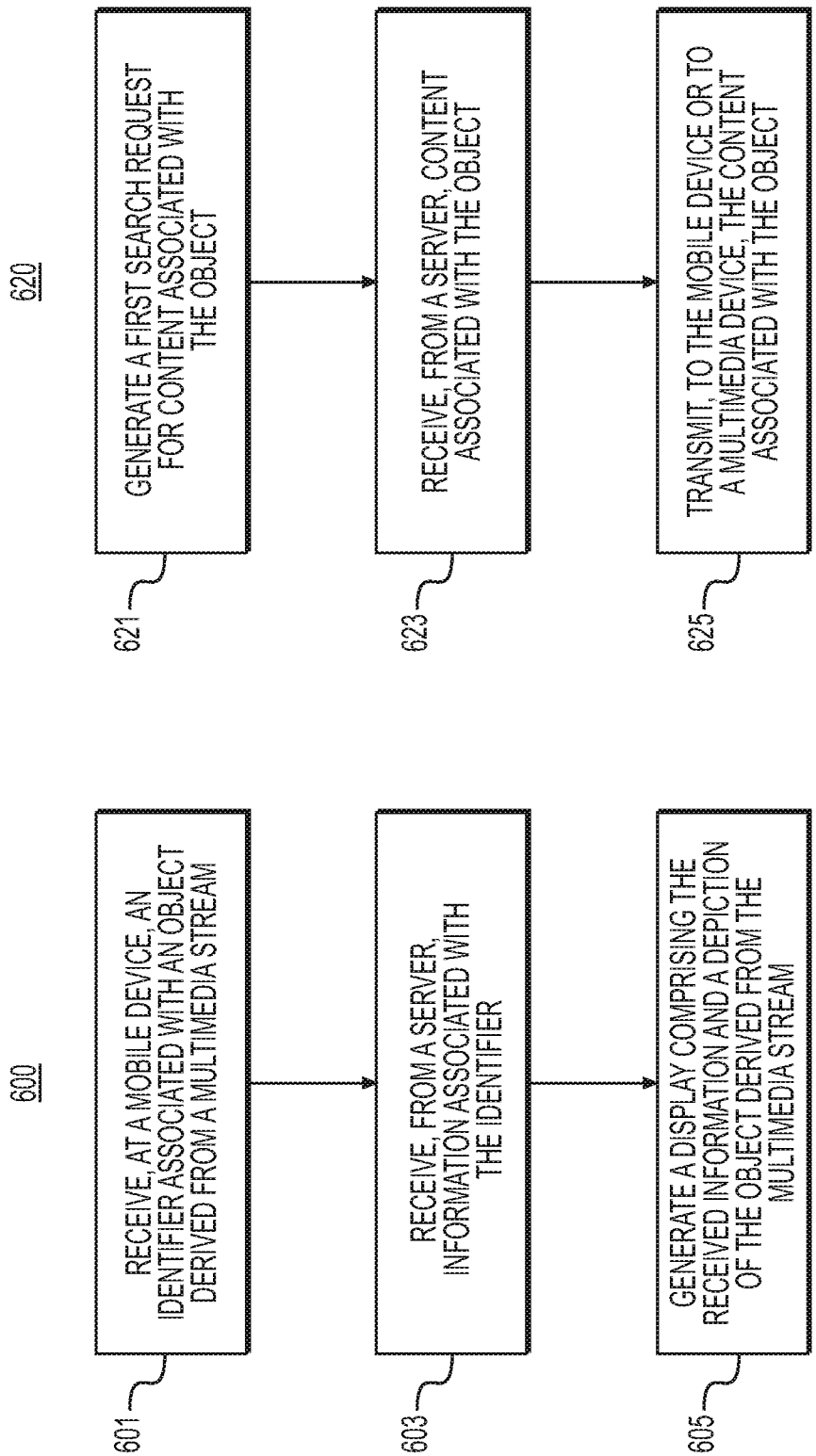
FIGS. 6A and 6B are flowcharts of exemplary methods of presenting virtual objects from a multimedia stream, on a user device, according to one aspect of the present disclosure.
Figure 7:
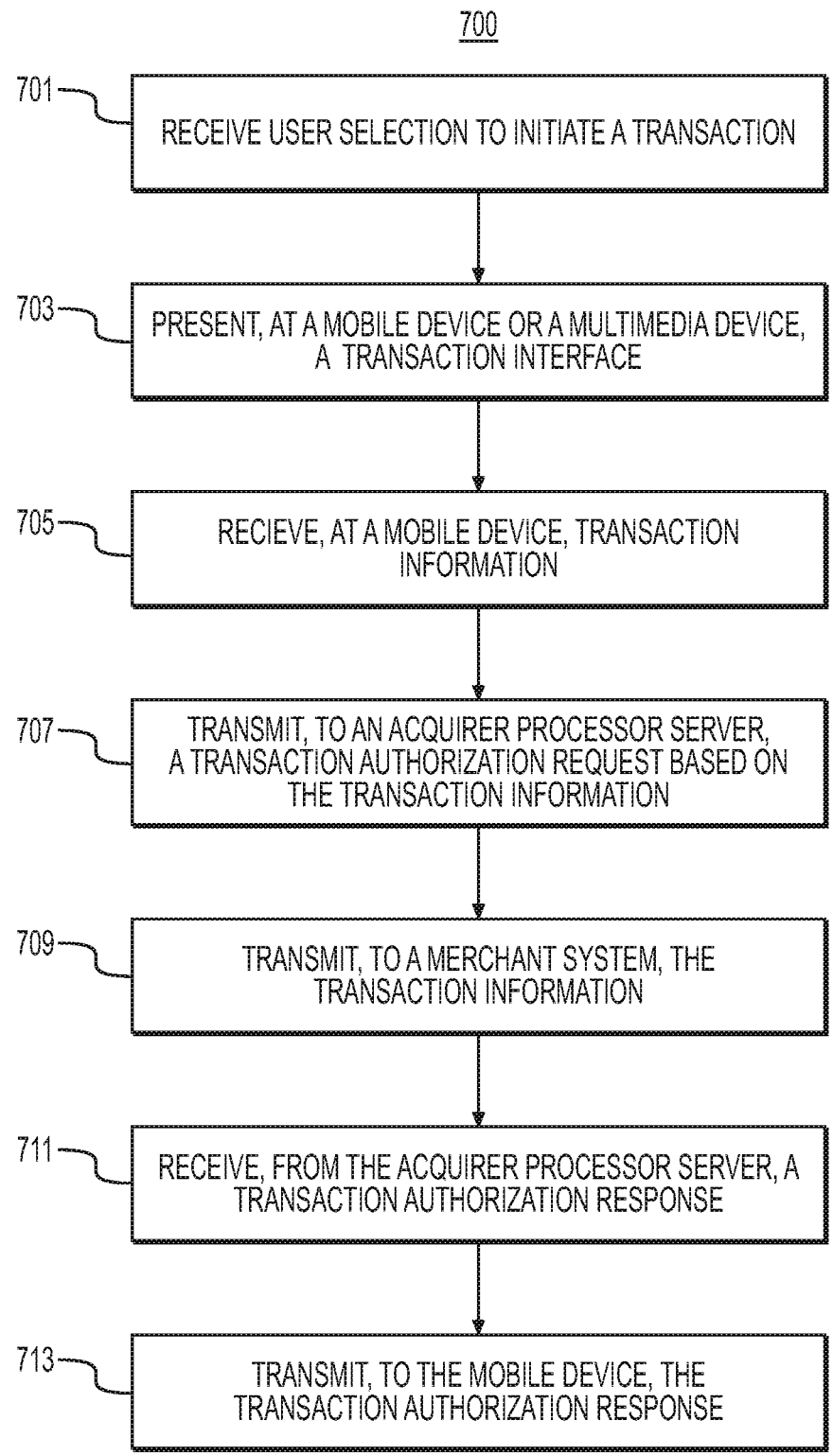
FIG. 7 is a flowchart of an exemplary method of processing transaction information received from an AR application, according to one aspect of the present disclosure.

FIG. 5 is a flowchart of an exemplary method 500 of enabling electronic transactions and presentation of virtual objects across disparate devices connected to an electronic network, as performed by a platform which may detect objects from a multimedia stream (e.g., content retrieval platform 135). FIGS. 6A and 6B are flowcharts of exemplary methods of presenting virtual objects from a multimedia stream, on a user device. FIG. 7 is a flowchart of an exemplary method 700 of performing a transaction using the described AR-enabled system.

FIG. 5 is a flowchart of an exemplary method 500 of enabling electronic transactions and presentation of virtual objects across disparate devices connected to an electronic network, according to one aspect of the present disclosure. Method 500 may be performed by the content retrieval platform 135. In one embodiment, step 501 may include detecting, using a multimedia device connected to an electronic network, an object in a multimedia stream. As previously discussed, the multimedia device may comprise a television set, speaker, or any other consumer media device. The detection mechanism may include retrieving object information provided, e.g., from a multimedia network. For example, television or radio packages may provide sponsor information as part of their programming. Content retrieval platform 135 may receive the information as a program is playing on a multimedia device connected to the network. Alternately or in addition, content retrieval platform 135 may use any object detection techniques, e.g., machine learning methods, speech recognition, sound recognition, image recognition, a library of predetermined objects, a sponsored object listing, previous transaction history associated with a user, or a combination thereof, to detect an object from a multimedia stream. For example, content retrieval platform 135 may determine an "object type" for a detected object. The type may be identified by a trained machine learning model comprising convolutional neural networks, which may be configured to distinguish between various objects based on visual features and classify each object under an object type or object name.

In one embodiment, the detection may include determining an identifier associated with the detected object (e.g., step 503). For example, if a consumer product, e.g., a beverage, is mentioned in a multimedia stream, an identifier may comprise a name or product type associated with the detected object. For instance, the identifier may include a product code for the product, e.g., "2 Liter size COKE."

Step 505 may include detecting a user device (e.g., a mobile device) connected to the electronic network, or sharing an electronic network with the multimedia device. For example, step 505 may include detecting an address, e.g., an IP address of the detected user device. Step 505 may further include sending a message to the address over the electronic network. The message may include the identifier of the detected object. For example, step 505 may include sending the identifier, "2 L size COKE" to the detected user device.

Step 507 may include generating or prompting a display of the detected object at the detected mobile device. In one embodiment, steps 505 and 507 may be performed in response to receiving a user selection of the object. For example, a user may see an object on their television screen and opt to display or store a virtual version of the object on their personal device. In one embodiment, step 507 may include generating a selection interface or detecting a selection interface at the multimedia device, where the selection interface may prompt a user to initiate display of the object at the mobile device.

The selection interface may include a display on a screen of the multimedia device or a voice command selection menu. For example, an icon or other visual cue may appear in the programming played on the multimedia device to indicate that an object may be put onto the mobile device.

The icon or visual cue may directly be part of the programming, or part of an AR view, e.g., visible from a user device 140. Display of the object at the detected mobile device may be based on user input in response to the generated selection interface. Exemplary user input may include a user gesturing (e.g., by a swiping or grabbing motion) or verbally cuing their multimedia device regarding a detected object. The gesture may be a body movement captured by the multimedia device or a motion made with a controller, e.g., a remote control or virtual reality controller. Alternately or in addition, user input may include motion at a user device, e.g., a swiping or pinching motion made by a user on an AR display shown on their user device, or a motion made using the user device. For example, user input to "capture" an object from their multimedia device may include aligning the user device with a bar code or QR code displayed on the multimedia device. Voice command, verbal cues, or other biometric data submissions may also serve as user input. For example, a user may trigger a voice command selection menu by stating, "BUY NOW." In some cases, the display may include a payment interface to purchase the detected object.

FIG. 6A is a flowchart of an exemplary method of 600 of presenting virtual objects from a multimedia stream onto a user device, according to one aspect of the present disclosure. For example, step 601 may include receiving, at a user device (e.g., user device 140), an identifier associated with an object. The object may be derived from a multimedia stream and the identifier may include a name or product type associated with the detected object. The identifier may be determined based on object detection mechanisms including machine learning, speech recognition, sound recognition, image recognition, a library of predetermined objects, a sponsored object listing, previous transaction history associated with a user, transaction history associated with the user device, or a combination thereof.

The identifier may be provided to the user device by a remote entity, e.g., content retrieval platform 135. Alternately or in addition, the identifier associated with the object may be received from a multimedia device associated with the multimedia stream, the multimedia device being a device other than the user device. For example, step 601 may include detecting, at the user device, an electronic network connected to a multimedia device and receiving the identifier from the multimedia device, via the electronic network. For example, step 601 may include detecting an electronic network and then further detecting a multimedia device connected to the electronic network. The multimedia device may comprise a television set, speaker, or any other consumer product.

Step 603 may include receiving, from a server, information associated with the identifier. The server may include a second content platform or a server operating/accessing virtual object database 145. Exemplary information may include object specification, weight, price, delivery information, promotional code(s), user review(s), image(s) of the object, size information, use information, material composition, nutritional information, dosage, serving size, ingredient information, warnings, warranty information, or a combination thereof.

Step 605 may include generating a display comprising the received information and a depiction of the object. For example, the display may include a payment interface and step 605 may be used to perform, at the mobile device, payment authentication for a purchase of or related to the object. Additional detail is provided in FIG. 7. Step 605 may also include storing the depiction of the object as a virtual object file as part of the user's file history. The user may access this file history and virtual object at a later time, either via a user device or multimedia device.

FIG. 6B is a flowchart of an exemplary method of 620 of receiving or retrieving content associated with a detected object, according to one aspect of the present disclosure. The steps of method 620 may be performed by a user device, a content retrieval platform, a multimedia device, a third party entity, or any combination thereof. In one embodiment, step 621 may include generating a search request for content associated with the detected object. This step may include transmitting the search request to a server, e.g., a content platform or server associated with virtual object database 145. Step 623 may include receiving, from the server, content associated with the object. Content may include virtual objects or multimedia associated with the detected object. For example, a detected object comprising a dessert item may have related objects comprising recipe multimedia, cooking videos, virtual objects depicting cake or ice cream, etc. Step 623 may include active content retrieval steps, e.g., providing authentication credentials permitting download or access to communications from the server. Step 625 may include transmitting, to the user device (e.g., user device 140) or the multimedia device (e.g., multimedia device 130), the content associated with the object.

FIG. 7 is a flowchart of an exemplary method of 700 of conducting a payment transaction using a virtual interface associated with an object from a multimedia stream, according to one aspect of the present disclosure. Step 701 may include receiving a user selection to initiate a transaction associated with an object from a multimedia stream. Step 703 may include presenting, at a user device or at a multimedia device, a transaction interface. The transaction interface may include purchase information related to the object, including, product specifications (e.g., size, quantity, dimensions, etc.), user reviews, price, shipping information and cost, related objects, etc. The transaction interface may also include menu of options for payment, e.g., a list of payment vehicles related to a user device or multimedia device, including credit card, bank, or app-based credit accounts. The transaction interface may be overlaid or superimposed on a display of the user device or multimedia device (e.g., as shown by transaction interface 410c in FIG. 4C). Step 705 may include receiving, at a mobile device, transaction information, e.g., payment credentials and/or user input indicating a desire to purchase the object. The transaction information may be received via a transaction interface presented on the mobile device. Step 705 may include retrieving previously-generated or stored user account information, or request that a user enter payment information. For example, AR application 234 may work in conjunction with a payment vehicle application 236 to present the transaction interface. The transaction interface may allow the user to confirm/modify the displayed transaction information and make an electronic payment. In some cases, step 705 also include receiving transaction information via a transaction interface displayed on a multimedia device 130.

Step 707 may include transmitting, to an acquirer processor server, a transaction authorization request based on the received transaction information. The transaction authorization request may be generated based on the transaction information received, e.g., from the user device 140. The transaction authorization request may comprise information needed by downstream entities (e.g., acquirer processor server 115, payment network 120, financial institution 125) to route and/or authorize the transaction. At step 709, the transaction information may be transmitted to a merchant system (i.e., merchant system 150 in FIG. 1). This step may be performed to confirm inventory of the object or to check whether the merchant system has any particular payment credential/security checks, loyalty programs, promotions/ price reductions, etc.

Step 711 may include receiving a transaction authorization response, e.g., from a merchant system 150 or an acquirer processor server 115. At step 713, the transaction authorization response may be transmitted to the user device 140 to complete a transaction. Completion of a transaction in this context may include providing payment for purchasing an object. The transaction authorization response may authorize payment transfer from the user's accounts (and financial institutions 125) to a merchant system (e.g., merchant system 150).

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 8 illustrates an implementation of a general computer system designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 804 includes a cache or random-access memory for the processor 802. In alternative implementations, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 800 may further include a display unit 810, such as a liquid crystal display (LCD), an organic light emitting diode (OLED), a flat panel display, a solid-state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 806.

Additionally or alternatively, the computer system 800 may include an input device 812 configured to allow a user to interact with any of the components of system 800. The input device 812 may be a number pad, a keyboard, or a cursor control device, such as a mouse, or a joystick, touch screen display, remote control, or any other device operative to interact with the computer system 800.

The computer system 800 may also or alternatively include a disk or optical drive unit 806. The disk drive unit 806 may include a computer-readable medium 922 in which one or more sets of instructions 824, e.g. software, can be embedded. Further, the instructions 824 may embody one or more of the methods or logic as described herein. The instructions 824 may reside completely or partially within the memory 804 and/or within the processor 802 during execution by the computer system 800. The memory 804 and the processor 802 also may include computer-readable media as discussed above.

In some systems, a computer-readable medium 822 includes instructions 824 or receives and executes instructions 824 responsive to a propagated signal so that a device connected to a network 160 can communicate voice, video, audio, images, or any other data over the network 160. Further, the instructions 824 may be transmitted or received over the network 160 via a communication port or interface 820, and/or using a bus 808. The communication port or interface 820 may be a part of the processor 802 or may be a separate component. The communication port 820 may be created in software or may be a physical connection in hardware. The communication port 820 may be configured to connect with a network 160, external media, the display 810, or any other components in system 800, or combinations thereof. The connection with the network 160 may be a physical connection, such as a wired Ethernet connection or may be established wirelessly as discussed below. Likewise, the additional connections with other components of the system 800 may be physical connections or may be established wirelessly. The network 160 may alternatively be directly connected to the bus 808.

While the computer-readable medium 822 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 822 may be non-transitory, and may be tangible.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 may be connected to one or more networks 160. The network 160 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 160 may include wide area networks (WAN), such as the Internet, local area networks (LAN), campus area networks, metropolitan area networks, a direct connection such as through a Universal Serial Bus (USB) port, or any other networks that may allow for data communication. The network 160 may be configured to couple one computing device to another computing device to enable communication of data between the devices. The network 160 may generally be enabled to employ any form of machine-readable media for communicating information from one device to another. The network 160 may include communication methods by which information may travel between computing devices. The network 160 may be divided into sub-networks. The sub-networks may allow access to all of the other components connected thereto or the sub-networks may restrict access between the components. The network 160 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for displaying objects between disparate devices connected to an electronic network, comprising:
   detecting, via a convolutional neural network, an object in a multimedia stream of a multimedia device connected to the electronic network, wherein image data of the object is inputted into the convolutional neural network, and the convolutional neural network applies a series of filters to raw pixel data of the image data to extract and learn higher-level features;
   determining an identifier associated with the detected object;
   detecting a mobile device connected to the electronic network, wherein the mobile device is a device other than the multimedia device;
   retrieving the image data of the detected object from a virtual detected object database based, at least in part, on the identifier associated with the detected object;
   generating a display of the image data of the detected object in a user interface of the detected mobile device, wherein size, orientation, and placement of the image data is adjusted during the display based, at least in part, on sensor data received from one or more sensors of the detected mobile device; and
   updating a display of the object in the multimedia stream of the multimedia device based, at least in part, on user input to the image data in the detected mobile device.

2. The method of claim 1, wherein the multimedia device comprises a television set or speaker.

3. The method of claim 1, further comprising:
   generating a selection interface at the multimedia device prompting a user to initiate display of the object at the detected mobile device; and
   generating the display of the object at the detected mobile device based on user input in response to the generated selection interface.

4. The method of claim 3, wherein the display includes a payment interface to purchase the detected object.

5. The method of claim 3, wherein the selection interface comprises a display on a screen of the multimedia device or wherein the selection interface comprises a voice command selection menu.

6. The method of claim 1, further comprising:
   receiving user input comprising a remote control selection, a motion or gesture, a voice command, a biometric data submission, or a combination thereof; and
   generating a selection interface at the multimedia device comprising a display on a screen of the multimedia device or comprising a voice command selection menu.

7. The method of claim 1, further comprising:
   determining an address of the detected mobile device; and
   sending a message to the address over the electronic network, the message comprising the identifier associated with the detected object.

8. The method of claim 1, wherein the identifier includes a name or product type associated with the detected object.

9. The method of claim 1, further comprising:
   determining the identifier based on object detection mechanisms including machine learning, speech recognition, sound recognition, image recognition, a library of predetermined objects, a sponsored object listing, previous transaction history associated with a user, transaction history associated with the detected mobile device, or a combination thereof.

10. A system for displaying objects between disparate devices connected to an electronic network, the system comprising:
one or more processors;
a data storage comprising instructions which, when executed by the one or more processors, cause the one or more processors to perform a method comprising:
detecting, via a convolutional neural network, an object in a multimedia stream of a multimedia device connected to the electronic network, wherein image data of the object is inputted into the convolutional neural network, and wherein the convolutional neural network applies a series of filters to raw pixel data of the image data to extract and learn higher-level features;
determining an identifier associated with the detected object;
detecting a mobile device connected to the electronic network, wherein the mobile device is a device other than the multimedia device;
retrieving the image data of the detected object from a virtual detected object database based, at least in part, on the identifier associated with the detected object;
generating a display of the image data of the detected object in a user interface of the detected mobile device, wherein size, orientation, and placement of the image data is adjusted during the display based, at least in part, on sensor data received from one or more sensors of the detected mobile device; and
updating a display of the object in the multimedia stream of the multimedia device based, at least in part, on user input to the image data in the detected mobile device.

11. The system of claim 10, wherein the multimedia device comprises a television set or speaker.

12. The system of claim 10, wherein the method further comprises:
generating a selection interface at the multimedia device prompting a user to initiate display of the object at the detected mobile device; and
generating the display of the object at the detected mobile device based on user input in response to the generated selection interface.

13. The system of claim 12, wherein the display includes a payment interface to purchase the detected object.

14. The system of claim 12, wherein the selection interface comprises a display on a screen of the multimedia device or wherein the selection interface comprises a voice command selection menu.

15. The system of claim 10, wherein the method further comprises:
receiving user input comprising a remote control selection, a motion or gesture, a voice command, a biometric data submission, or a combination thereof; and
generating a selection interface at the multimedia device comprising a display on a screen of the multimedia device or comprising a voice command selection menu.

16. The system of claim 10, wherein the method further comprises:
determining an address of the detected mobile device; and
sending a message to the address over the electronic network, the message comprising the identifier associated with the detected object.

17. The system of claim 10, wherein the identifier includes a name or product type associated with the detected object.

18. The system of claim 10, wherein the method further comprising:
determining the identifier based on object detection mechanisms including machine learning, speech recognition, sound recognition, image recognition, a library of predetermined objects, a sponsored object listing, previous transaction history associated with a user, transaction history associated with the detected mobile device, or a combination thereof.

19. A non-transitory computer readable medium comprising instructions which, when executed by one or more processors, cause the one or more processors to perform a method comprising:
detecting, via a convolutional neural network, an object in a multimedia stream of a multimedia device connected to an electronic network, wherein image data of the object is inputted into the convolutional neural network, and the convolutional neural network applies a series of filters to raw pixel data of the image data to extract and learn higher-level features;
determining an identifier associated with the detected object;
detecting a mobile device connected to the electronic network, wherein the mobile device is a device other than the multimedia device;
retrieving the image data of the detected object from a virtual detected object database based, at least in part, on the identifier associated with the detected object;
generating a display of the image data of the detected object in a user interface of the detected mobile device, wherein size, orientation, and placement of the image data is adjusted during the display based, at least in part, on sensor data received from one or more sensors of the detected mobile device; and
updating a display of the object in the multimedia stream of the multimedia device based, at least in part, on user input to the image data in the detected mobile device.

20. The non-transitory computer readable medium of claim 19, wherein the method further comprises:
generating a selection interface at the multimedia device prompting a user to initiate display of the object at the detected mobile device; and
generating the display of the object at the detected mobile device based on user input in response to the generated selection interface.

* * * * *